United States Patent
Oochi

(10) Patent No.: US 7,126,635 B1
(45) Date of Patent: Oct. 24, 2006

(54) VIDEO APPARATUS AND METHOD FEATURING MULTIPLE SCAN MODE IMPLEMENTATION

(75) Inventor: Yoshikazu Oochi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/357,220

(22) Filed: Jul. 20, 1999

(30) Foreign Application Priority Data

Jul. 22, 1998 (JP) ................................. 10-206953

(51) Int. Cl.
*H04N 5/335* (2006.01)
*H04N 5/225* (2006.01)
*H04N 5/235* (2006.01)

(52) U.S. Cl. ................. 348/296; 348/220.1; 348/222.1; 348/317

(58) Field of Classification Search ............. 348/220.1, 348/222.1, 294–324, 333, 220, 221; 386/117–121; 250/208.1
See application file for complete search history.

(56) References Cited

U.S. PATENT DOCUMENTS

| | | | |
|---|---|---|---|
| 4,564,766 A * | 1/1986 | Kuroda et al. ............... 348/314 |
| 4,839,734 A * | 6/1989 | Takemura .................... 348/317 |
| 5,659,359 A * | 8/1997 | Mochizuki et al. ......... 348/296 |
| 5,767,903 A * | 6/1998 | Kawamura et al. ......... 348/296 |
| 5,894,143 A * | 4/1999 | Tanigawa et al. ........... 348/312 |
| 5,929,900 A * | 7/1999 | Yamanaka et al. ....... 348/220.1 |
| 5,978,023 A * | 11/1999 | Glenn ........................ 348/234 |
| 6,222,986 B1 * | 4/2001 | Inuiya ........................ 386/120 |
| 6,259,478 B1 * | 7/2001 | Hori ........................... 348/296 |
| 6,377,301 B1 * | 4/2002 | Hieda ..................... 348/231.99 |
| 6,614,477 B1 * | 9/2003 | Lee et al. .................... 348/296 |
| 6,657,674 B1 * | 12/2003 | Asada et al. ............. 348/222.1 |

FOREIGN PATENT DOCUMENTS

JP        10-145650        * 5/1998

* cited by examiner

*Primary Examiner*—David Ometz
*Assistant Examiner*—Nhan Tran
(74) *Attorney, Agent, or Firm*—Frommer Lawrence & Haug LLP; William S. Frommer; Paul A. Levy

(57) ABSTRACT

The video camera apparatus and image sensing method are capable of obtaining a still image without blurring even when a moving object is picked up with use of a solid image sensor capable of progressive scanning. An electronic shutter of a CCD image sensor 23 capable of outputting an image sensing signal in a progressive scan mode is controlled by a timing signal generator 28, with the field cycle according to the standard television system used as a basic cycle, to cause the CCD image sensor 23 to output an image sensing signal in the progressive scan mode.

8 Claims, 11 Drawing Sheets

VIDEO APPARATUS AND METHOD FEATURING MULTIPLE SCAN MODE IMPLEMENTATION

TECHNICAL FIELD

The present invention relates to a video camera apparatus and an image-sensing method in which images are picked up by a solid image sensor capable of outputting an image sensing signal in a progressive scan mode with use of an electronic shutter.

BACKGROUND ART

Conventionally, in a video camera apparatus according to a standard television system such as NTSC (National Television Systems Committee) or PAL (Phase Alternation by Line), an interlace-scanned image sensing signal is obtained from an image-sensing section and is outputted as a video signal according to a predetermined standard television system. Further, in a video cassette recorder (VCR) or a video tape recorder (VTR) integrated with a camera, which is a so-called camcorder, a solid image sensor performs image sensing operation synchronized with a vertical synchronization signal VD, as shown in FIG. 11, and image sensing charges are read out for every one field as a charge storing period, thereby to obtain an interlace-scanned image sensing signal. Thus, a video signal according to a predetermined standard television system, generated from this image sensing signal is dealt with. In case of dealing with a still image in the camcorder, since two fields of the interlace-scanned image sensing signal form an image corresponding to one frame, a time delay between fields causes deterioration of image quality. Therefore, recording/reproducing of a still image is carried out by converting an interlaced signal into a progressive scan signal.

In contrast, in an electronic still camera specialized for still images, a still image sensing signal with high quality obtained by progressive scanning from a solid image sensor capable of progressive scanning is recorded onto a recording medium.

In a solid image sensor capable of progressive scanning, a still image sensing signal with high quality can be obtained by progressive scanning. However, as shown in FIG. 12, since charge storing is carried out in one frame period, the image is blurred when a moving object is picked up. A problem hence appears in that the image cannot be quite still.

Hence, the present invention has an object of providing a video camera apparatus and an image sensing method capable of obtaining a still image without blurring even when a moving object is picked up as an image with use of a solid image sensor capable of progressive scanning.

DISCLOSURE OF THE INVENTION

To achieve the above object, a video camera apparatus according to the present invention comprises: a solid image sensor having an electronic shutter, for outputting an image sensing signal in a progressive scan mode; and drive control means for controlling the electronic shutter of the solid image sensor at a field cycle of a standard television system used as a basic cycle, thereby to output the image sensing signal from the solid image sensor in the progressive scan mode.

An image sensing method according to the present invention comprises steps of: controlling an electronic shutter of a solid image sensor which outputs an image sensing signal in a progressive scan mode at a field cycle of a standard television system used as a basic cycle; and outputting the image sensing signal from the solid image sensor in the progressive scan mode.

Another video camera apparatus according to the present invention comprises: a solid image sensor having an electronic shutter, for outputting an image sensing signal in an interlace scan mode or a progressive scan mode; control means for controlling the electronic shutter such that a shutter speed in the progressive scan mode is equal to a shutter speed in the interlace scan mode; and output means for outputting the image sensing signal in the progressive scan mode, based on the shutter speed.

Another image sensing method according to the present invention comprises steps of: controlling an electronic shutter of a solid image sensor which outputs an image sensing signal in an interlace scan mode or a progressive scan mode, such that a shutter speed in the progressive scan mode is equal to a shutter speed in the interlace scan mode; and outputting the image sensing signal from the solid image sensor in the progressive scan mode.

An image sensing signal recording apparatus according to the present invention comprises: a solid image sensor having an electronic shutter, for outputting an image sensing signal in a progressive scan mode; drive control means for controlling the electronic shutter of the solid image sensor at a field cycle of a standard television system used as a basic cycle, thereby to output the image sensing signal from the solid image sensor in the progressive scan mode; scan converter means for converting the image sensing signal based on progressive scanning, into an interlace scan signal; and recording means for recording the image sensing signal based on progressive scanning, or the image sensing signal converted into the interlace scan signal.

An image sensing signal recording method according to the present invention comprises steps of: controlling an electronic shutter of a solid image sensor which outputs an image sensing signal in a progressive scan mode at a field cycle of a standard television system used as a basic cycle; outputting the image sensing signal from the solid image sensor in the progressive scan mode; converting the image sensing signal into an interlace scan signal; and recording the interlace scan signal or a progressive scan signal.

Still another video camera apparatus according to the present invention comprises: a solid image sensor having an electronic shutter, for outputting an image sensing signal in an interlace scan mode or a progressive scan mode; control means for controlling the electronic shutter such that a shutter speed in the progressive scan mode is equal to a shutter speed in the interlace scan mode; output means for outputting the image sensing signal in the progressive scan mode, based on the shutter speed; scan converter means for converting the image sensing signal based on progressive scanning, into an interlace scan signal; and recording means for recording the image sensing signal based on the progressive scanning, or the image sensing signal converted into the interlace scan signal.

Another image sensing signal recording method according to the present invention comprises steps of: controlling an electronic shutter of a solid image sensor which outputs an image sensing signal in an interlace scan mode or a progressive scan mode, such that a shutter speed in the progressive scan mode is equal to a shutter speed in the interlace scan mode; outputting the image sensing signal from the solid image sensor in the progressive scan mode;

converting the image sensing signal into an interlace scan signal; and recording the interlace scan signal or a progressive scan signal.

As has been described above, according to the present invention, the electronic shutter of the solid image sensor which outputs an image sensing signal in the progressive scan mode is controlled at the field cycle of the standard television system used as the basic cycle, so an image sensing signal is outputted from the solid image sensor in the progressive scan mode. In this manner, it is possible to obtain a fine still image without blurring even when a moving object is picked up.

Thus, according to the present invention, it is possible to provide a video camera apparatus and an image sensing method in which a still image without blurring can be obtained even when a moving object is picked up with use of a solid image sensor capable of progressive scanning.

BEST MODE FOR CARRYING OUT THE INVENTION

In the following, embodiments of the present invention will be explained in details with reference to the drawings.

Figure 1:
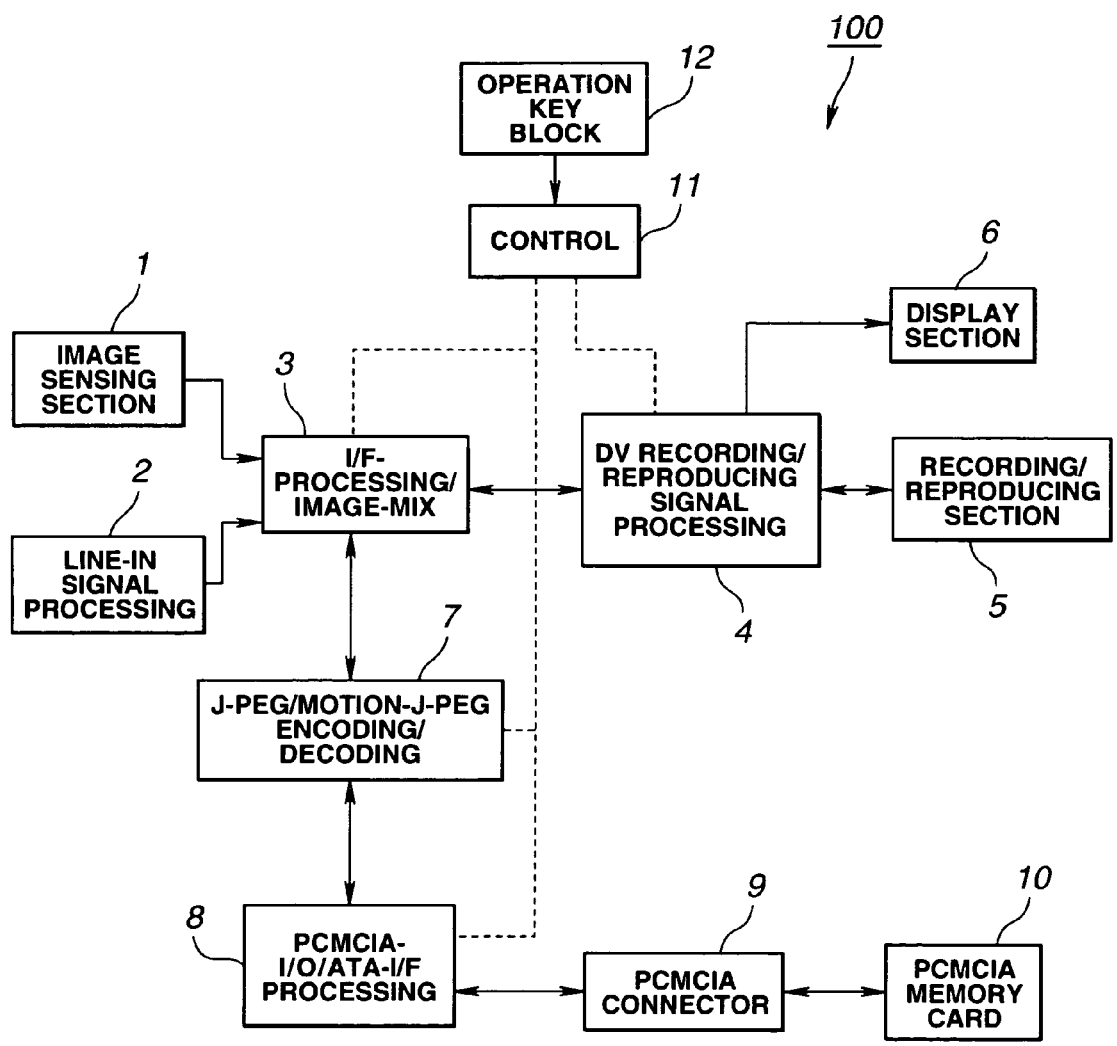
FIG. 1 is a block diagram showing the structure of a camcorder to which the present invention is applied.

For example, the present invention is applied to a camcorder 100 constructed in a structure as shown in FIG. 1. This camcorder 100 comprises an I/F-processing/image-MIX circuit 3 supplied with an image signal from an image sensing section 1 and/or a line-in signal processing circuit 2, a recording/reproducing section 5 and a display section 6 connected to the circuit 3 through a DV recording/reproducing signal processing circuit 4, an I/F processing circuit 8 connected to the circuit 3 through an encoder/decoder circuit 7, a PCMCIA (Personal Computer Memory Card International Association) memory card 10 detachably connected to the circuit 8 through a connector 9, a control section 11 for controlling these components, and an operation block 12 connected to the control section 11.

Figure 2:
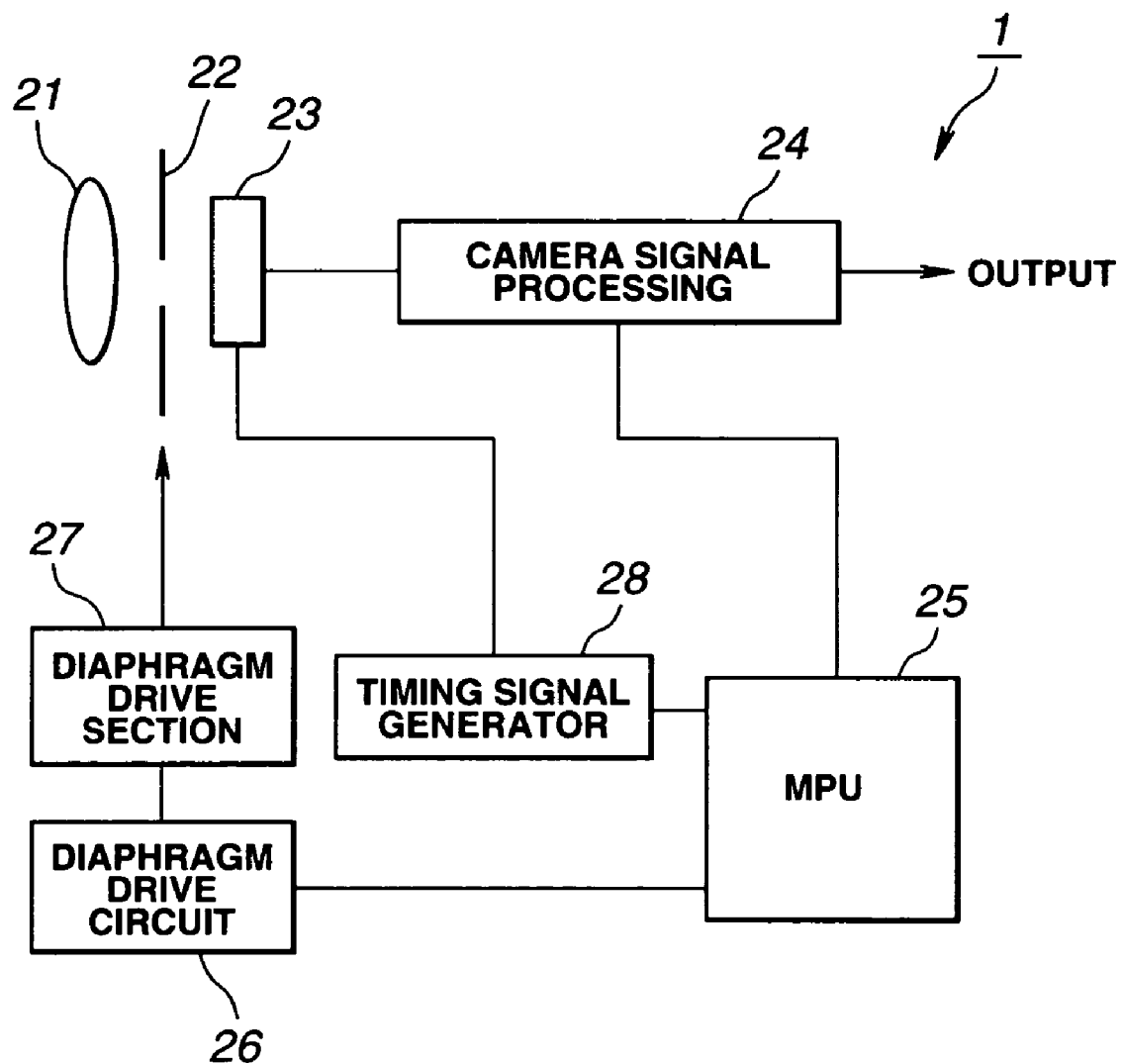
FIG. 2 is a block diagram showing the schematic structure of an image sensing section of the camcorder.
Figure 3:
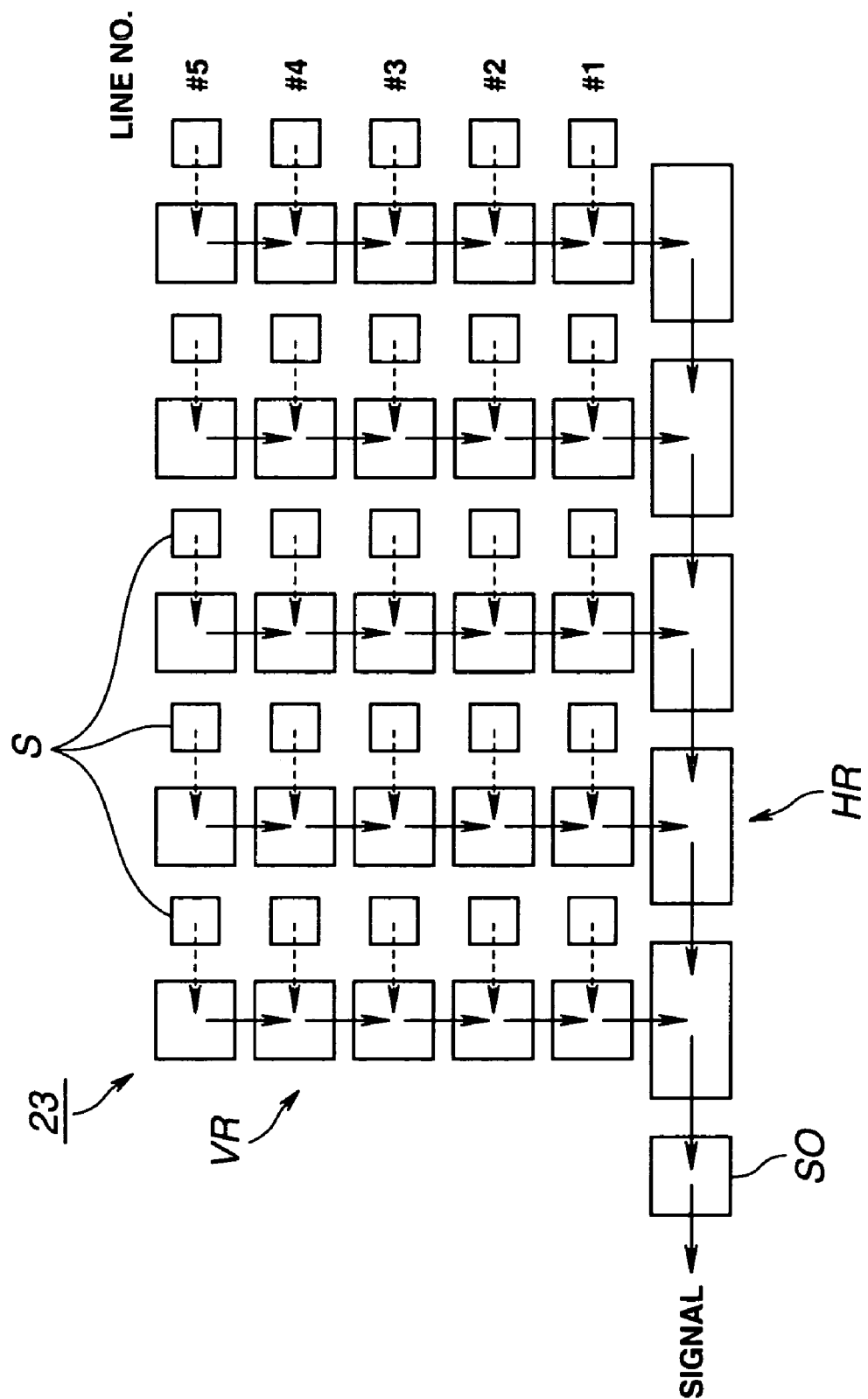
FIG. 3 is a plan view schematically showing the structure of a CCD image sensor of the image sensing section.
Figure 4:
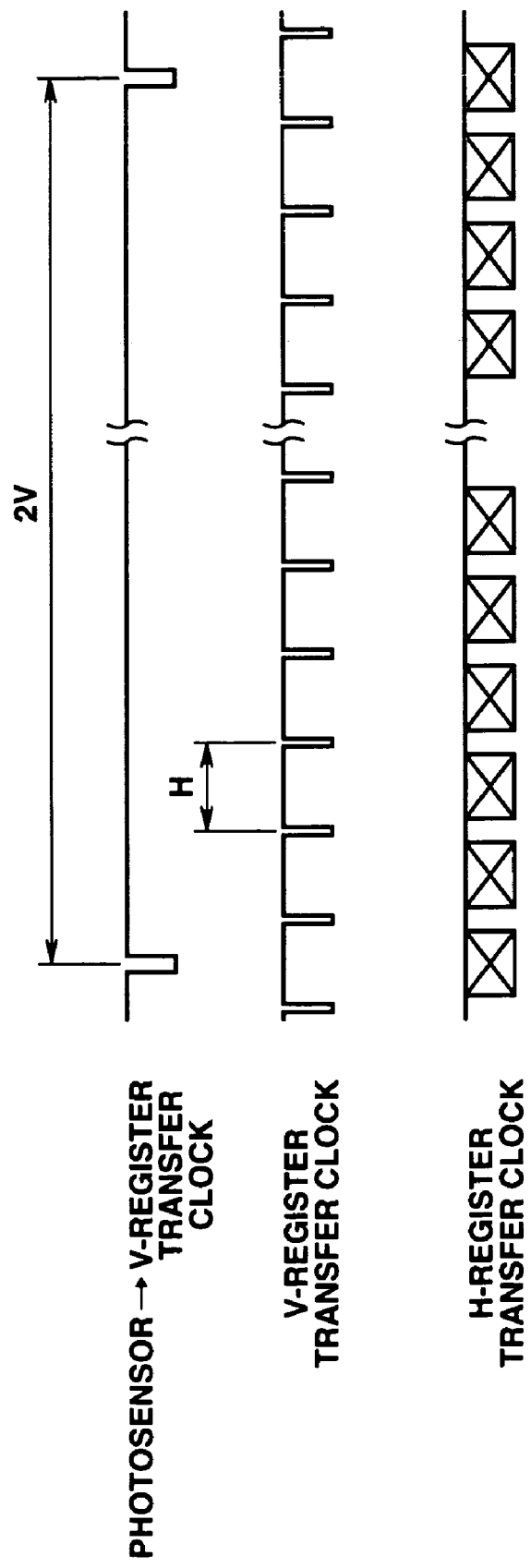
FIG. 4 is a timing chart showing image sensing operation of the CCD image sensor in the progressive scan mode.

The image sensing section 1 includes a CCD image sensor 23 to which image sensing light enters through a diaphragm 22 from the image sensing lens 21, as can be seen from the schematic structure shown in FIG. 2. An image sensing signal obtained as an image-sensing output by the CCD image sensor 23 is outputted through a camera signal processing circuit 24.

The diaphragm 22 is driven by a diaphragm drive section 27 connected to a diaphragm drive circuit 26 supplied with a diaphragm control signal from a camera control microcomputer 25.

Also, the CCD image sensor 23 is driven in such a manner that various timing signals such as a sensor gate signal, a transfer clock, and the like are supplied to the CCD image sensor 23 from a timing signal generator 28.

The camera signal processing circuit 24 and the timing signal generator 28 are arranged such that operation modes are switched in accordance with a control signal supplied from the camera control microcomputer 25.

The CCD image sensor 23 comprises photosensors S arranged in form of a matrix so as to correspond to pixels, vertical transfer registers VR from which image sensing charges of the pixels obtained by the photosensors are read out, horizontal transfer registers HR to which image sensing charges of the pixels of are transferred through the vertical transfer registers VR for every horizontal line, and an output section SO. The image sensing charges of the pixels are outputted as image sensing signals through the output section SO from the horizontal transfer registers HR, for every horizontal line. This CCD image sensor 23 is a CCD image of progressive scan type, and there are provided vertical transfer registers VR corresponding in number to the number of pixels constituting one horizontal line. Each vertical transfer register VR has transfer steps corresponding in number to the number of pixels in the vertical direction.

Further, the timing signal generator 28 generates a sensor gate signal SG of 2 fields (2V) equivalent to one frame cycle (1F), a vertical transfer clock CKV of 1 horizontal scan cycle (1H), and a horizontal transfer clock CKH of a frequency corresponding to the number of pixels on the horizontal line, when the progressive scan mode is set by a control signal supplied from the camera control microcomputer 25.

That is, in the progressive scan mode, image sensing charges of the pixels obtained by the respective photosensors S of the CCD image sensor 23 are read out to the vertical transfer registers VR by means of the sensor gate signal SG, for every two fields equivalent to 1 frame period (1F). The image sensing charges read onto the vertical transfer registers VR are transferred to the horizontal transfer registers HR, for every one horizontal scanning period. At last, the image sensing charges of the pixels are outputted as image sensing signals through the output section SO, for every horizontal line.

Further, in the progressive scan mode, the timing signal generator 28 controls the electronic shutter of the CCD image sensor 23, with the field cycle of the standard television system used as the basic cycle.

Figure 5:
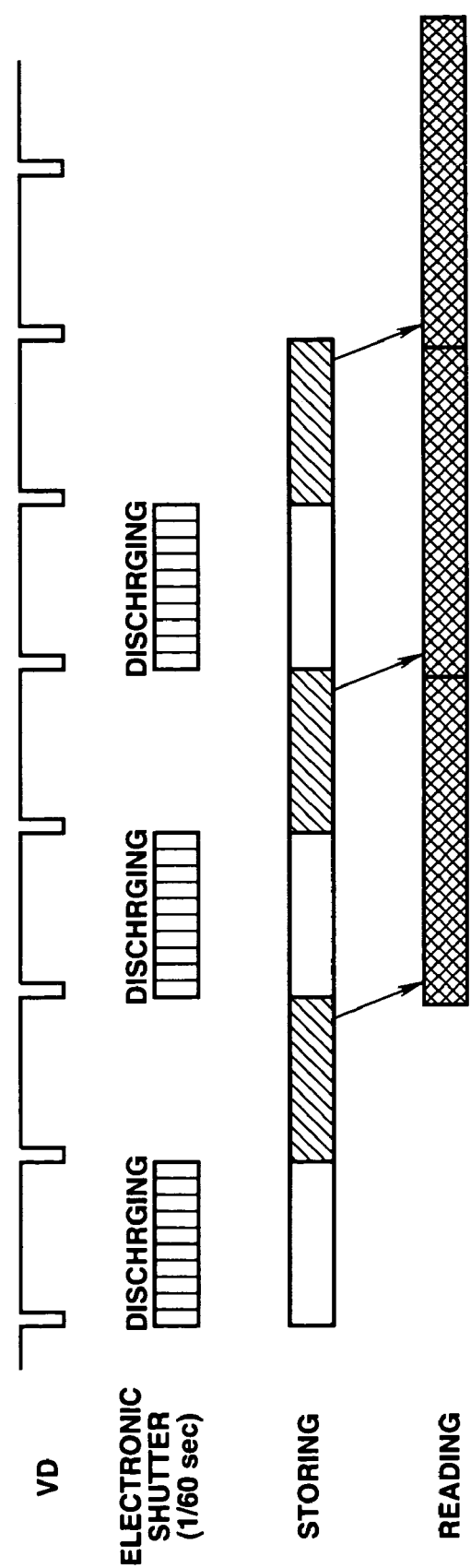
FIG. 5 is a timing chart showing image sensing operation using an electronic shutter in the progressive scan mode.

That is, for example, if the electronic shutter is set at 1 field period (1/60 second) according to the NTSC system, as shown in FIG. 5, charges are all discharged out in the first field and next charges are stored in the second field.

The stored charges read out in the next two fields equivalent to another one frame. This means that the charges for one field are read out, and therefore, blurred images are not formed unlike by interlace scanning. Thus, in the progressive scan mode, the electronic shutter of the CCD image sensor 23 is controlled at the basic cycle of 1/60 second, so a fine still image can be picked up.

Figure 6:
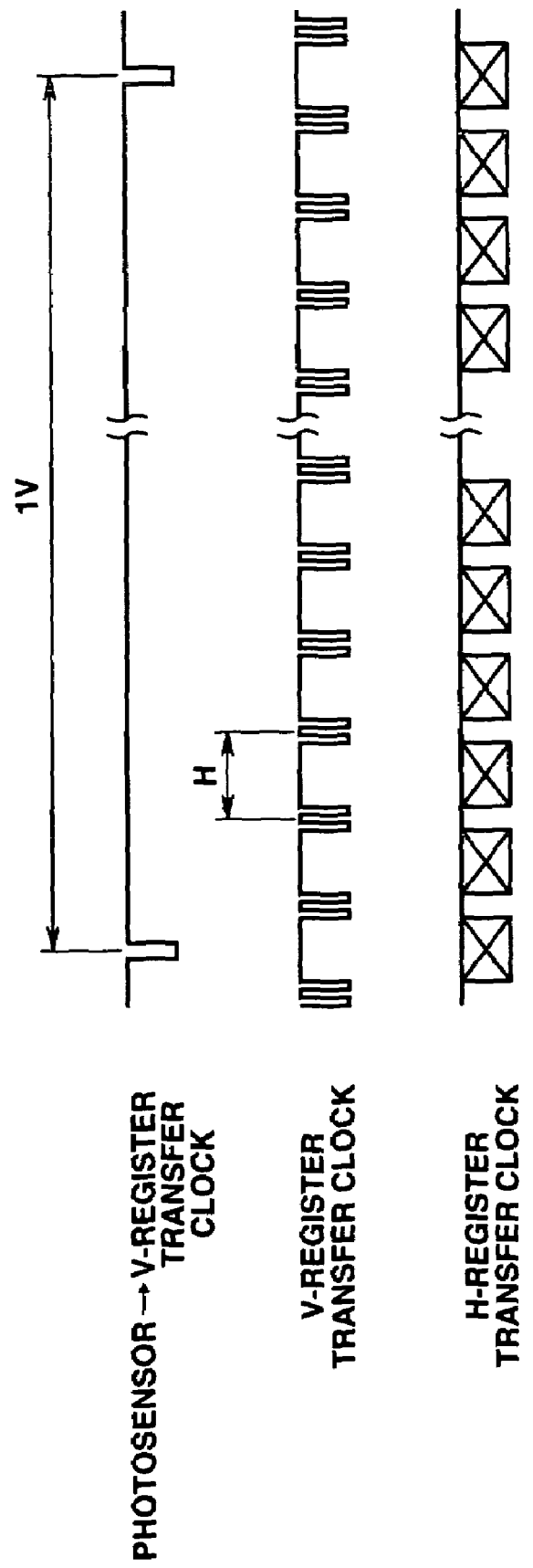
FIG. 6 is a timing chart showing image sensing operation of the CCD image sensor in the interlace scan mode.

Also, as shown in FIG. 6, when the interlace scan mode is set by a control signal supplied from the camera control microcomputer 25, the timing signal generator 28 generates a sensor gate signal SG at 1 field cycle (1V), two continuous vertical transfer clocks CKV for every 1 horizontal scanning period (1H), and a horizontal transfer clock CKH at a frequency corresponding to the number of pixels in one scanning line.

That is, in the interlace scan mode, the image sensing charges of the pixels obtained by the photosensors S of the CCD image sensor 23 are read out onto the vertical transfer registers VR by a sensor gate signal SG, for every one field period (1V). The image sensing charges read onto the vertical transfer registers VR are transferred to the vertical transfer registers HR, for every two horizontal lines in each horizontal scanning period (1H). The charges of every adjacent two pixels are added (synthesized) together in the horizontal transfer registers HR, so the number of horizontal lines is reduced to ½, and the image sensing charges of the pixels are outputted as an image sensing signal from the horizontal transfer registers HR through the output section SO, for every horizontal line. As a result of this, the image sensing signals are outputted as interlace scan signals. The combination of the adjacent two pixels is changed between the odd-numbered field and the even-numbered field.

Further, in this camcorder 100, the I/F-processing/image-MIX circuit 3 performs interface processing on the signals inputted from the image sensing section 1 and the line signal processing circuit, and also performs mixing of the signals. Also, the DV recording/reproducing signal processing circuit 4 performs signal processing with respect to recording/reproducing of information signals according to the so-called digital video (DV) standard. Further, the recording/reproducing section 5 records information signals from the DV recording/reproducing signal processing circuit 4 onto a recording medium. Also, the section 5 reproduces information signals from the recording medium and supplies the signals to the DV recording/reproducing signal processing circuit 4. For example, a magnetic tape is used as the magnetic recording medium.

The display section 6 serves to display information signals recorded/reproduced through the DV recording/reproducing signal processing circuit 4.

The encoder/decoder circuit 7 serves to decode a still image according to the JPEG (Joint Photographic Expert Group) standard or a video image according to the Motion JPEG standard, into an image signal, or to encode an image signal of a still image or a video image into an encoded image according to the standards described above. This encoder/decoder circuit 7 performs the above processing on image signals or encoded images from the I/F-processing/image-MIX circuit 3 or the PCMCIA I/O/ATA I/F processing circuit 8.

Further, the PCMCIA I/O/ATA I/F 8 is a circuit which functions as an interface between JPEG/Motion-JPEG encoder/decoder circuit 7 and the PCMCIA memory card 10. Also, the PCMCIA connector 12 is a connector according to the PCMCIA standard.

Figure 7:
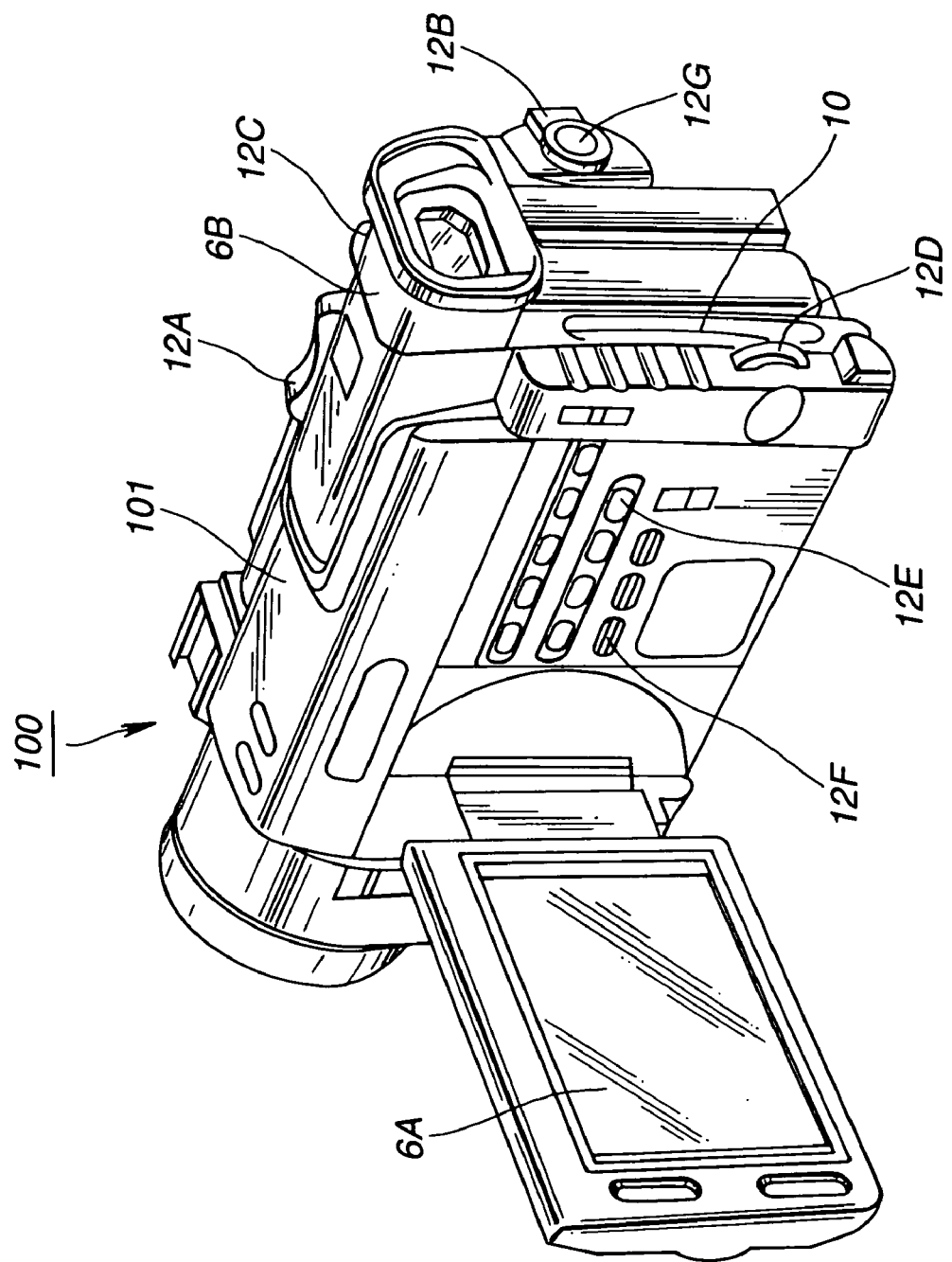
FIG. 7 is a perspective view showing the outer appearance of the camcorder.

As for the camcorder 100, the outer appearance of the camera body 101 is shown in the perspective view in FIG. 7. The camera body 101 is provided with an electronic view finder 6A and a liquid crystal display panel 6B, as the display section 6. As for the operation block 12, the camera body 101 is provided with various setting operation buttons such as a zoom operation lever 12A, an operation mode switch lever 12B, a still image sensing operation button 12C, a control dial 12D, a menu button 12E, a data code button 12F, and the like.

The zoom operation lever 12A supplies the control section 11 with zoom operation input data corresponding to the operation position of the lever. Further, the control section 11 controls the zoom drive section of the image sensing lens 21 of the image sensing section 1 in accordance with the zoom operation input data.

Figure 8:
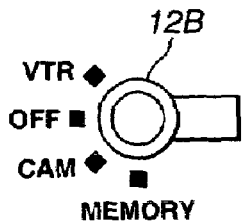
FIG. 8 is a view showing switch positions of an operation mode switch lever provided for the camcorder.

Also, as shown in FIG. 8 the operation mode switch lever 12B has four switch setting positions as follows.
POSITION 1: VTR
POSITION 2: OFF
POSITION 3: CAM
POSITION 4: MEMORY Operation input data corresponding to each position is supplied to the control section 11. Also, the still image sensing operation button 12C is pushed by two steps, so operation input data pieces corresponding to the push positions at the first step and the second step can be supplied to the control section 11. Further, the control section 11 controls the image sensing section 1, the I/F-processing/image-MIX circuit 3, the DV recording/reproducing signal processing circuit 4, the recording/reproducing section 5, the encoder/decoder circuit 7, the I/F processing circuit 8, and the like, in the following manner, in accordance with the operation input data.

That is, in the camcorder 100, the control section 11 set the camcorder 100 in the VTR mode when the operation mode switch lever 12B is at the position 1. In the VTR mode, the control section 11 receives an operation input through a VTR operation button not shown and controls the recording/reproducing section 5 in accordance with the operation input. For example, reproducing by the recording/reproducing section 5 is started when the reproducing button is operated.

Also, the control section 11 sets the camcorder in a operation stop state, when the operation switch lever 12B is at the position 2.

Also, the control section 11 sets the camcorder in the camera mode, when the operation mode switch lever 12B is at the position 3. In the camera mode, the control section 11 operates the image sensing section 1 so as to display an image based on an image sensing signal, on the display section, e.g., the electronic view finder 6A or the liquid crystal display panel 6B. Further, when an operation input from a start/stop button 12G is received in this image sensing stand-by state, recording by the recording/reproducing section 5 is started. When another operation input from the start/stop button 12G is received again, the recording is terminated and the image sensing stand-by state is recovered.

Also, in the camera mode, the control section 11 accepts operation input data by a push operation on the still image sensing operation button 12C. If the operation input data by the push operation on the still image sensing operation button 12C is accepted in the image sensing stand-by state, the image sensing signal obtained by the image sensing section 1 is captured as a still image and is displayed on the display section 6, at the push position at the first step of the still image sensing operation button 12C. If the still image sensing operation button 12C is further pushed to the push position at the second step, the captured still image is recorded by the recording/reproducing section 5 for a predetermined time period (e.g., 7 seconds in this example). Note that voice is also recorded by the recording/reproducing section 5 during recording. If the still image sensing operation button 12C is released before the push position at the second step, the still image to be recorded by the recording/reproducing section 5 can be reselected.

If the still image sensing operation button 12C is pushed during camera recording, the control section 11 controls the recording/reproducing section 5 so as to record the image at this time as a still image, for a predetermined time period (e.g., 7 seconds in this example) and returns again to the image sensing stand-by state after completion of this recording.

Also, the control section 11 sets the camcorder 100 in the memory mode when the operation mode switch lever 12B is at the position 4.

In this memory mode, the control section 11 forcedly switches the operation mode of the image sensing section 1 to the progressive scan mode.

Further, when the control section 11 receives operation input data by a push operation on the still image sensing operation button 12C in this memory mode, an image sensing signal obtained as a progressive scan signal is captured by the image sensing section 1 and is displayed on the display section 6, at the push position of the first step of the still image sensing operation button 12C. When the still image sensing operation button 12C is further pushed to the push position of the second step, the captured still image is recorded onto the memory card 10. Note that the still image to be recorded onto the memory card 10 can be reselected if the still image sensing operation button 12C is not pushed to the push position of the second step but is released.

Since the image sensing signal obtained as a progressive scan signal by the image sensing section 1 cannot be directly displayed by the display section 6 which operates with an interlace scan signal, the progressive scan signal is converted into an interlace scan signal and is then displayed on the display section 6. Also, in this camcorder 100 in the camera mode, the image sensing operation is performed by switching the operation mode of the image sensing section 1 to the progressive scan mode, and the image sensing signal obtained as a progressive scan signal by the image sensing section 1 is converted into an interlace scan signal and is then recorded by the recording/reproducing section 5.

Figure 9A:
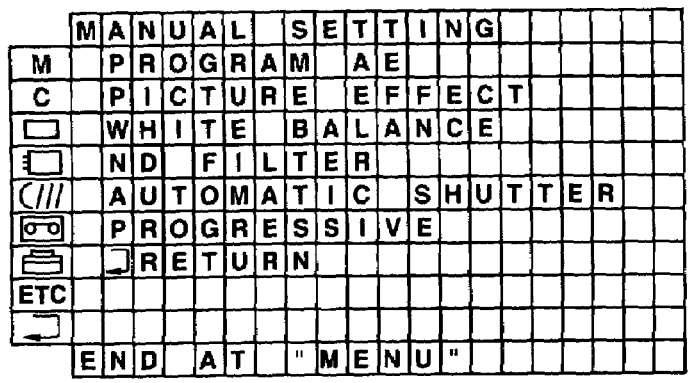
FIG. 9 is a view for explaining the setting of the progressive scan mode in the camera mode of the camcorder.
Figure 9B:
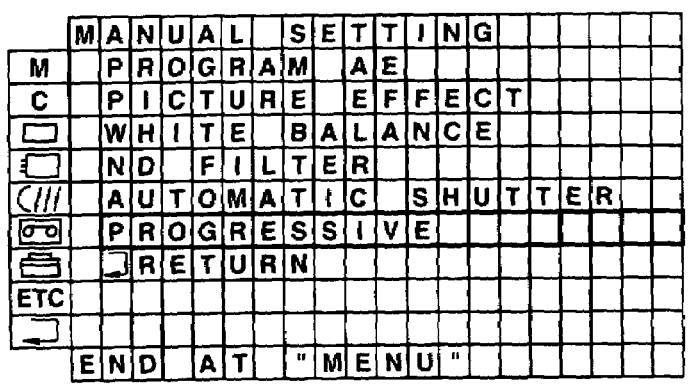

To set the progressive scan mode in the camera mode, the menu button 12E provided on the camera body 101 is pushed in the image sensing stand-by state thereby to display the menu screen on the display section 6, and the control dial 12D is rotated so as to switch the "progressive" to "ON" from "OFF", as shown in FIGS. 9(A) and (B).

The above explanation has been made of a case where the image sensing section 1 in the camcorder 100 performs progressive scanning of 2-field storing.

Figure 10:
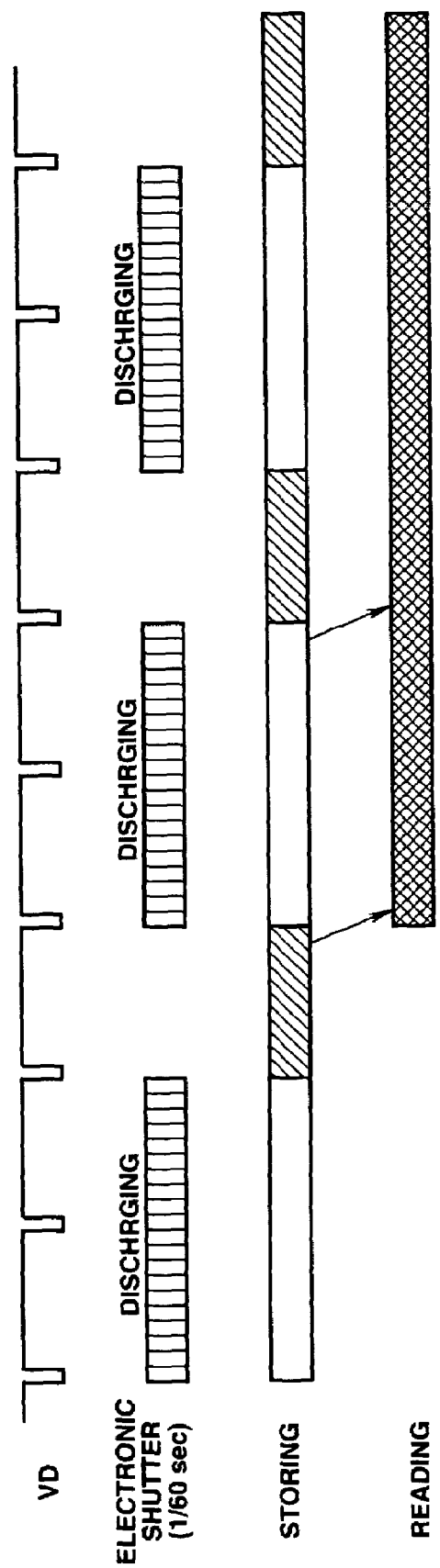
FIG. 10 is a timing chart showing image sensing operation using an electronic shutter in the progressive scan mode in case where 3-field storing is performed.
Figure 11:
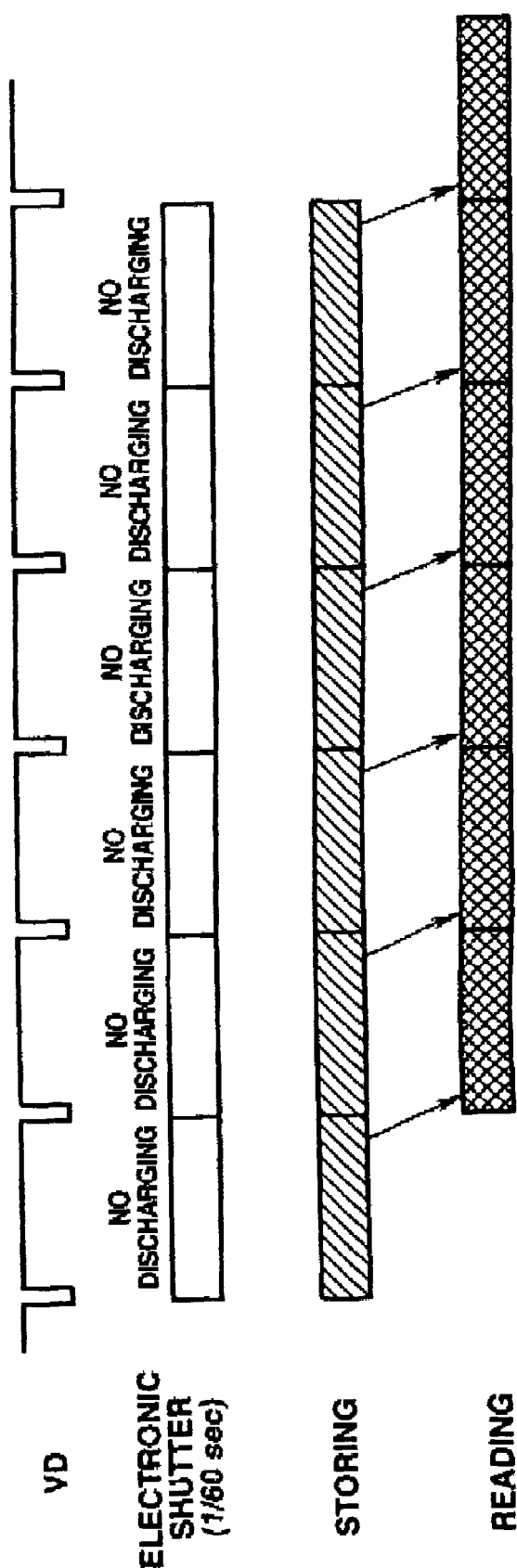
FIG. 11 is a timing chart showing image sensing operation using a solid image sensor which performs conventional interlace scanning.
Figure 12:
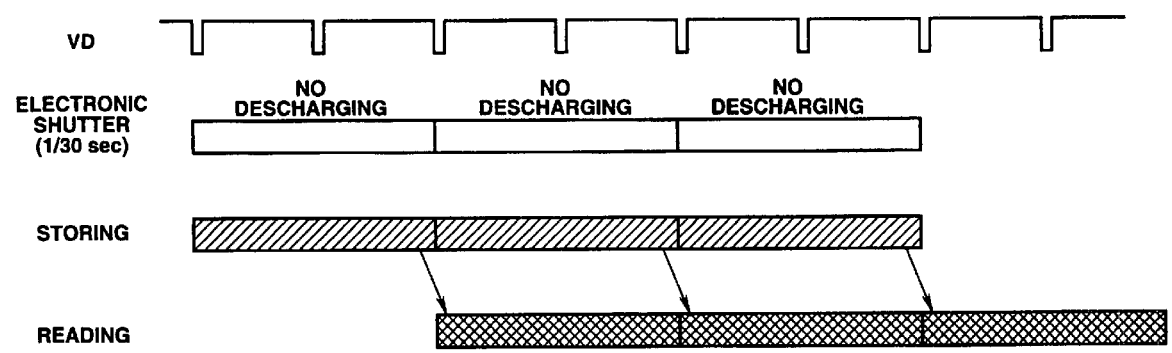
FIG. 12 is a timing chart showing image sensing operation using a solid image sensor capable of conventional progressive scanning.

However, as shown in FIG. 10, when performing 3-field storing, the electronic shutter is controlled at the basic cycle of two fields (1/30 second). Also, when the exposure is too much, the electronic shutter may be controlled at a higher speed than 1/60 second, in place of controlling the diaphragm to be reduced down.

The invention claimed is:

1. A video camera apparatus for capturing video and still images as frames, the apparatus comprising:
   a solid image sensor having an electronic shutter for outputting an image sensing signal in a progressive scan mode, said solid image sensor including a plurality of pixel sensors configured to process charges accumulated on the pixel sensors as the image sensing signal,
   wherein, in said progressive scan mode, the charges accumulated and stored for a first field of a particular frame are discharged before the charges accumulated for a second field of the particular frame are stored, and wherein the stored charges of the second field are read out in next two fields of a subsequent frame;
   drive control means for controlling the electronic shutter of the solid image sensor at a field cycle of a standard television system used as a basic cycle, thereby to output the image sensing signal from the solid image sensor in the progressive scan mode;
   encoding means for encoding the image sensing signal outputted from the solid image sensor; and
   memory means for recording the image sensing signal encoded by said encoding means,
   wherein, when an image is captured for generating a still image that is recorded on said memory means, the progressive scan mode is forcedly set.

2. An image sensing method comprising steps of:
   controlling an electronic shutter of a solid image sensor which outputs an image sensing signal in a progressive scan mode at a field cycle of a standard television system used as a basic cycle, said solid image sensor including a plurality of pixel sensors;
   processing charges accumulated on said plurality of pixel sensors as the image sensing signal including: in said progressive scan mode, discharging the charges accumulated and stored for a first field of a particular frame before storing the charges accumulated for a second field of the particular frame; and reading out the stored charges of the second field in next two fields of a subsequent frame;
   outputting the image sensing signal from the solid image sensor in the progressive scan mode, and
   encoding the image sensing signal outputted from the solid image sensor; and
   recording the encoded image sensing signal,
   wherein, when an image is captured for generating a still image that is recorded, the progressive scan mode is forcedly set.

3. A video camera apparatus for capturing video and still images as frames, the apparatus comprising:
   a solid image sensor having an electronic shutter for outputting an image sensing signal in an interlace scan mode or a progressive scan mode, said solid image sensor including a plurality of pixel sensors configured to process charges accumulated on the pixel sensors as the image sensing signal,
   wherein, in said progressive scan mode, the charges accumulated and stored for a first field of a particular frame are discharged before the charges accumulated for a second field of the particular frame are stored, and wherein the stored charges of the second field are read out in next two fields of a subsequent frame;
   control means for controlling the electronic shutter such that a shutter speed in the progressive scan mode is equal to a shutter speed in the interlace scan mode;
   output means for outputting the image sensing signal in the progressive scan mode, based on the shutter speed;
   encoding means for encoding the image sensing signal outputted from the solid image sensor; and
   memory means for recording the image sensing signal encoded by said encoding means,
   wherein, when an image is captured for generating a still image that is recorded on said memory means, the progressive scan mode is forcedly set.

4. An image sensing method comprising steps of:
   controlling an electronic shutter of a solid image sensor which outputs an image sensing signal in an interlace scan mode or a progressive scan mode, such that a shutter speed in the progressive scan mode is equal to a shutter speed in the interlace scan mode, said solid image sensor including a plurality of pixel sensors; processing charges accumulated on said plurality of pixel sensors as the image sensing signal including: in said progressive scan mode, discharging the charges accumulated and stored for a first field of a particular frame before storing the charges accumulated for a second field of the particular frame; and reading out the stored charges of the second field in next two fields of a subsequent frame;

outputting the image sensing signal from the solid image sensor in the progressive scan mode;

encoding the image sensing signal outputted from the solid image sensor; and recording the encoded image sensing signal, wherein, when an image is captured for generating a still image that is recorded, the progressive scan mode is forcedly set.

5. An image sensing signal recording apparatus for recording video and still images as frames, the apparatus comprising:

a solid image sensor having an electronic shutter, for outputting an image sensing signal in a progressive scan mode, said solid image sensor including a plurality of pixel sensors configured to process charges accumulated on the pixel sensors as the image sensing signal, wherein, in said progressive scan mode, the charges accumulated and stored for a first field of a particular frame are discharged before the charges accumulated for a second field of the particular frame are stored, and wherein the stored charges of the second field are read out in next two fields of a subsequent frame; drive control means for controlling the electronic shutter of the solid image sensor at a field cycle of a standard television system used as a basic cycle;

scan converter means for converting the image sensing signal based on progressive scanning, into an interlace scan signal;

recording means for recording the image sensing signal based on progressive scanning, or the image sensing signal converted into the interlace scan signal;

encoding means for encoding the image sensing signal outputted from the solid image sensor; and memory means for recording the image sensing signal encoded by said encoding means, wherein, when an image is captured for generating a still image that is recorded on said memory means, the progressive scan mode is forcedly set.

6. An image sensing signal recording method comprising steps of:

controlling an electronic shutter of a solid image sensor which outputs an image sensing signal in a progressive scan mode at a field cycle of a standard television system used as a basic cycle, said solid image sensor including a plurality of pixel sensors;

processing charges accumulated on said plurality of pixel sensors as the image sensing signal including: in said progressive scan mode, discharging the charges accumulated and stored for a first field of a particular frame before storing the charges accumulated for a second field of the particular frame; and reading out the stored charges of the second field in next two fields of a subsequent frame;

outputting the image sensing signal from the solid image sensor in the progressive scan mode, converting the image sensing signal into an interlace scan signal;

recording the interlace scan signal or a progressive scan signal;

encoding the image sensing signal outputted from the solid image sensor; and recording the encoded image sensing signal, wherein, when an image is captured for generating a still image that is recorded, the progressive scan mode is forcedly set.

7. The video camera according to claim 1, wherein the encoding means encodes the image sensing signal according to JPEG (Joint Photographic Expert Group) standard.

8. The video camera according to claim 1, wherein the memory means is a removable memory.

* * * * *